United States Patent
Chigusa (10) Patent No.: US 8,213,053 B2
(45) Date of Patent: Jul. 3, 2012

(54) INFORMATION PROCESSING APPARATUS AND COMPUTER-READABLE INFORMATION RECORDING MEDIUM

(75) Inventor: Yoshinari Chigusa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 441 days.

(21) Appl. No.: 12/484,333

(22) Filed: Jun. 15, 2009

(65) Prior Publication Data

US 2009/0316197 A1  Dec. 24, 2009

(30) Foreign Application Priority Data

Jun. 18, 2008 (JP) .................................. 2008-158628
Jun. 12, 2009 (JP) .................................. 2009-140831

(51) Int. Cl.
   G06K 15/00 (2006.01)
   G06K 9/66 (2006.01)
   G06K 9/62 (2006.01)
   G06K 9/68 (2006.01)
   H04N 1/40 (2006.01)
   H04N 1/407 (2006.01)
   G06F 3/12 (2006.01)
   G03G 15/01 (2006.01)

(52) U.S. Cl. ........ 358/2.1; 358/1.9; 358/3.24; 358/3.27; 358/1.13; 358/1.18; 382/192; 382/224; 382/228; 399/28

(58) Field of Classification Search .................. None
See application file for complete search history.

(56) References Cited

U.S. PATENT DOCUMENTS

| | | | |
|---|---|---|---|
| 7,505,172 B2 * | 3/2009 | Vondran et al. | 358/1.9 |
| 7,618,115 B2 * | 11/2009 | Chigusa | 347/19 |
| 8,108,247 B2 * | 1/2012 | Klassen | 705/7.35 |
| 2002/0080376 A1 | 6/2002 | Momose et al. | |
| 2003/0043392 A1 * | 3/2003 | Sugimoto | 358/1.9 |
| 2003/0047099 A1 * | 3/2003 | Hanyu | 101/484 |
| 2004/0223174 A1 * | 11/2004 | Mikami | 358/1.9 |
| 2005/0094191 A1 * | 5/2005 | Vondran et al. | 358/1.15 |
| 2007/0003306 A1 * | 1/2007 | Jacobsen et al. | 399/79 |
| 2007/0153308 A1 * | 7/2007 | Zemach et al. | 358/1.9 |
| 2008/0075480 A1 * | 3/2008 | Konishi et al. | 399/27 |
| 2009/0016748 A1 * | 1/2009 | Ferlitsch | 399/39 |

FOREIGN PATENT DOCUMENTS

| | | |
|---|---|---|
| JP | 2002-182871 | 6/2002 |
| JP | 2003-280841 | 10/2003 |
| JP | 2006-209389 | 8/2006 |
| JP | 2006-255914 | 9/2006 |

* cited by examiner

*Primary Examiner* — Hilina S Kassa
(74) *Attorney, Agent, or Firm* — IPUSA, PLLC (57) ABSTRACT

A type detecting part detects types of drawing objects included in a printing job. A rate detecting part detects a rate of each type of drawing object. A storing part stores the rate of each type of drawing object as a count value of a statistics counter which counts predetermined units of drawing objects for each type of drawing object. A comparing part compares a previously set printing quality with a recommended printing quality which is derived from count values of statistics counters. A changing part changes the previously set printing quality to the recommended printing quality when the previously set printing quality is different from the recommended printing quality.

7 Claims, 11 Drawing Sheets

IN TERMS OF STATISTICS, "PRIORITY FOR CHARACTER"
SEEMS OPTIMUM FOR PRINTING QUALITY SETPOINT.
PRINTING QUALITY SETPOINT IS TO BE CHANGED TO
"PRIORITY FOR CHARACTER"?

YES      NO

INFORMATION PROCESSING APPARATUS AND COMPUTER-READABLE INFORMATION RECORDING MEDIUM

BACKGROUND OF THE INVENTION

1. Field of the Invention

The present invention relates to an information processing apparatus and a computer-readable information recording medium.

2. Description of the Related Art

In order to carry out control of forming an image with the use of an image forming apparatus such as a printer, a facsimile, a copier, a plotter, or a multi-function peripheral having functions of a printer, a facsimile, a copier and/or a plotter, in an electrophotographic system or a liquid jetting recording system, a program called a printer driver is used, and an information processing apparatus mounting the printer driver is used to create printing data or set printing conditions.

As a function of the printer driver, such a function may be provided to prepare optimum processes according to characteristics of printing data as printing quality setpoints for when drawing objects such as character objects, photograph objects and graphic objects included in a user's printing data are processed, and a user can selects a printing quality setpoint.

Further, as discussed in Japanese Laid-Open Patent Application No. 2006-209389, in variable printing which combines various types of printing data, characteristics of halftone screens for graphics, characters, natural images and computer graphics contradict each other. Therefore, an image forming procedure which is optimum to all of these types of printing data cannot be designated when all of these types of printing data are incorporated together. In order to solve the problem, a printing setpoint is attached to each type of printing data to be incorporated together. Then, when a master document is output, an output condition to be given priority is set, and an optimum printing setpoint is generated for outputting the document obtained from the combination.

However, many users do not often change setpoints of a printer driver depending on particular printing data, and usually use default setpoints as they are. Therefore, although various printing quality setpoints such as "priority to character", "priority to photograph", "priority to character/graphic" and so forth, are available, there are few cases where users actually use these printing quality setpoints. As a result, a printing result optimum to printing data may not be actually provided.

SUMMARY OF THE INVENTION

The present invention has been devised in consideration of the above-mentioned problem, and an object of the present invention is to make it possible that a user can obtain an optimum printing result even when the user has no knowledge of printing quality setpoints.

In order to achieve the object, according to the present invention, an information processing apparatus has a type detecting part configured to detect types of drawing objects included in a printing job; a rate detecting part configured to detect a rate of each type of drawing object; a storing part configured to store the rate of each type of drawing object as a count value of a statistics counter which counts predetermined units of drawing objects for each type of drawing object; a comparing part configured to compare a previously set printing quality setpoint with a recommended printing quality setpoint which is derived from count values of the statistics counters; and a changing part configured to change the previously set printing quality setpoint to the recommended printing quality setpoint when the previously set printing quality setpoint is different from the recommended printing quality setpoint.

According to another aspect of the present invention, an information processing apparatus has a type detecting part configured to detect types of drawing objects included in each page of a printing job; a statistics data detecting part configured to detect statistics data of a rate for each type of drawing object for a plurality of printing jobs which a user requests; a storing part configured to store the statistics data; a comparing part configured to compare a current printing quality setpoint with a recommended printing quality setpoint which is derived from the statistics data; a notifying part configured to notify a user of urging the user to change the printing quality setpoint to the recommended printing quality setpoint, when the current printing quality setpoint is different from the recommended printing quality setpoint; and a changing part configured to change the current printing quality setpoint to the recommended printing quality setpoint when a change of the current printing quality setpoint to the recommended printing quality setpoint is approved by the user in response to a notification. The information processing apparatus comprises a computer, and the computer acts as the type detecting part, the statistics data detecting part, the storing part, the comparing part, the notifying part and the changing part, as a result of a computer processor executing corresponding programs.

According to yet another aspect of the present invention, a computer-readable information recording medium storing a program which, when executed by a computer processor, performs detecting types of drawing objects included in a printing job; detecting a rate of each type of drawing object; storing the rate of each type of drawing object as a count value of a statistics counter which counts predetermined units of drawing objects for each type of drawing object; comparing previously set printing quality with recommended printing quality which is derived from count values of the statistics counters; and changing the previously set printing quality to the recommended printing quality when the previously set printing quality is different from the recommended printing quality.

Other objects, features and advantages of the present invention will become more apparent from the following detailed description when read in conjunction with the accompanying drawings.

DETAILED DESCRIPTION OF THE PREFERRED EMBODIMENTS

Below, embodiments will be described with reference to figures. First, an information processing apparatus in an embodiment will be described with reference to FIG. 1.

Figure 1:
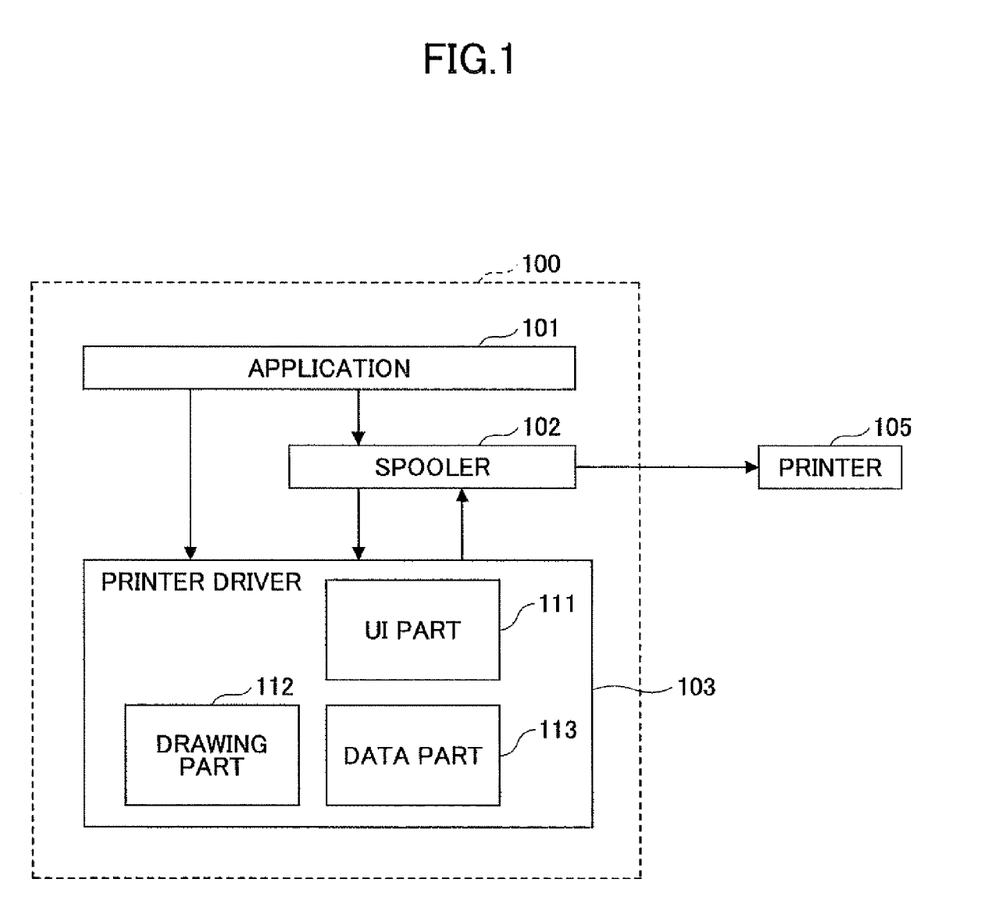
FIG. 1 depicts a function block diagram of an information processing apparatus in an embodiment.

The information processing apparatus 100 depicted in FIG. 1 includes an application 101, a spooler 102, and a printer driver 103. The printer driver 103 includes a UI part 111, a drawing part 112 and a data part 113. An example of a hardware configuration and a function block configuration of the information processing apparatus 100 will be described later with reference to FIGS. 10 and 11.

In the information processing apparatus 100, output data which is provided by the application 101 is sent to the printer driver 103 after once being held by the spooler 102 which is provided by an OS (Operating System, not depicted in FIG. 1) or, is directly sent to the printer driver 103.

In the printer driver 103, the UI (i.e., User Interface) part 111 provides a UI which provides and controls a printing property page to a user. The drawing part 112 analyzes given drawing objects included in the output data of the application 101, and generates drawing data. The data part 113 stores a printing quality setpoint which the drawing part 112 stores and reads, and various sorts of data (halftone screen data and so forth) which the drawing part 112 reads when carrying out drawing processing. It is noted that drawing objects mean drawing commands or such for generating two-dimensional printing data.

The drawing part 112 detects rates of types of drawing objects which are included in the output data of the application 101, which output data is used to print a printing page. The drawing part 112 stores the detected rates of types of drawing objects as count values of statistics counters, in the data part 113. The UI part 111 carries out timing control for carrying out a notification to a user to urge a change of a printing quality setpoint to a recommended setpoint as is necessary, and, when the user approves the change of the printing quality setpoint to the recommended setpoint, the UI part 111 actually changes the printing quality setpoint to the recommended setpoint, which will be described later.

The printer driver 103 outputs printing data obtained from the drawing part 110 which carries out drawing processing on the output data of the application, to the spooler 102.

The spooler 102 sends the printing data, obtained from the drawing processing, to the printer 105 which acts as an image forming apparatus.

Figure 6:
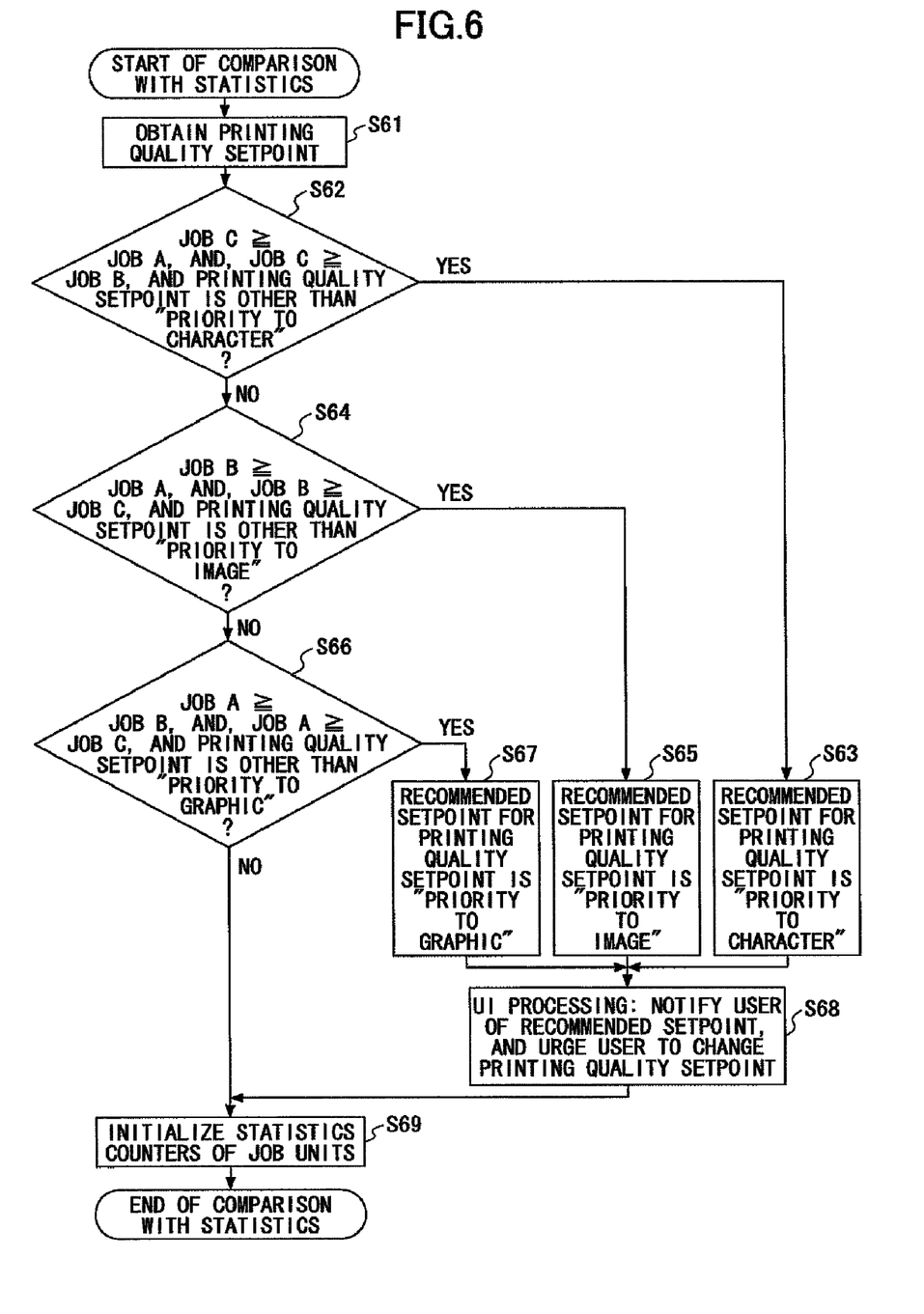
FIG. 6 depicts a flowchart illustrating comparing processing between statistics and a printing quality setpoint.
Figure 7:
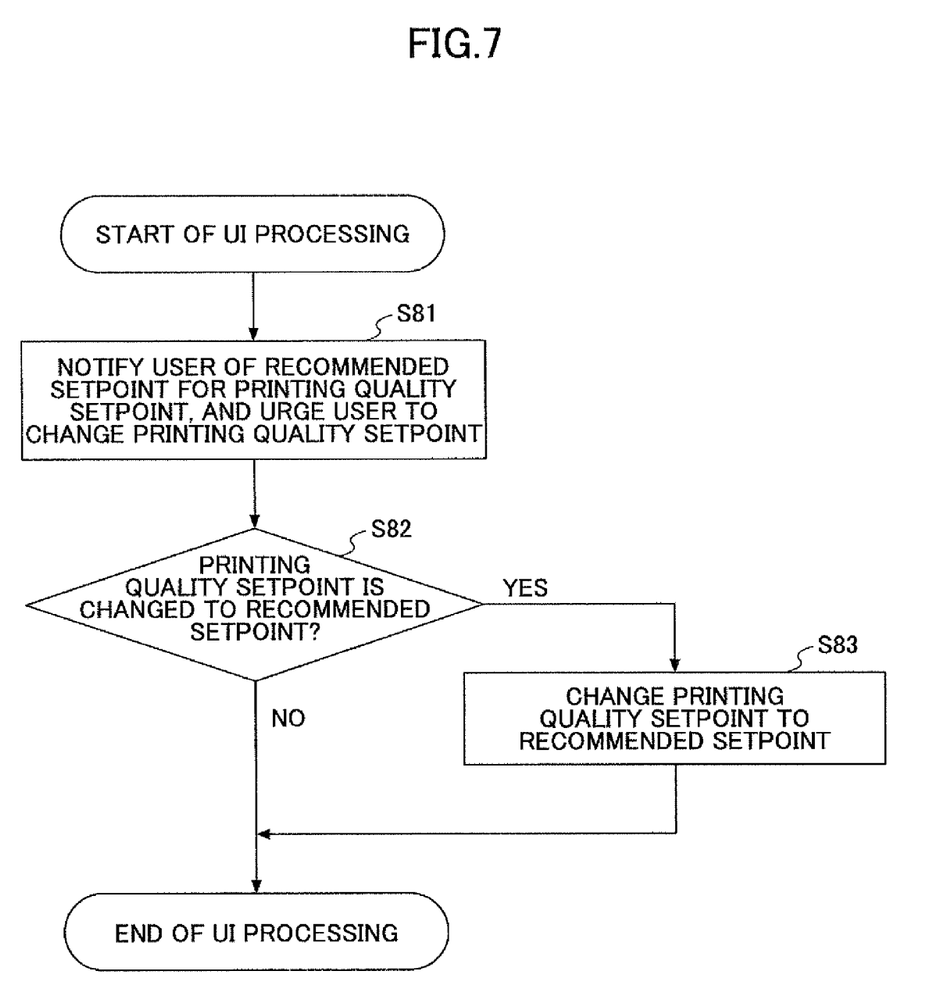
FIG. 7 depicts a flowchart of UI processing.

Next, with reference to FIGS. 2 through 7, processing which the information processing apparatus 100 carries out will be described. It is noted that processing described with reference to FIGS. 2 through 5 is carried out by the drawing part 112 of the printer driver 103, and processing described with reference to FIGS. 6 and 7 is carried out by the UI part 111.

Figure 2:
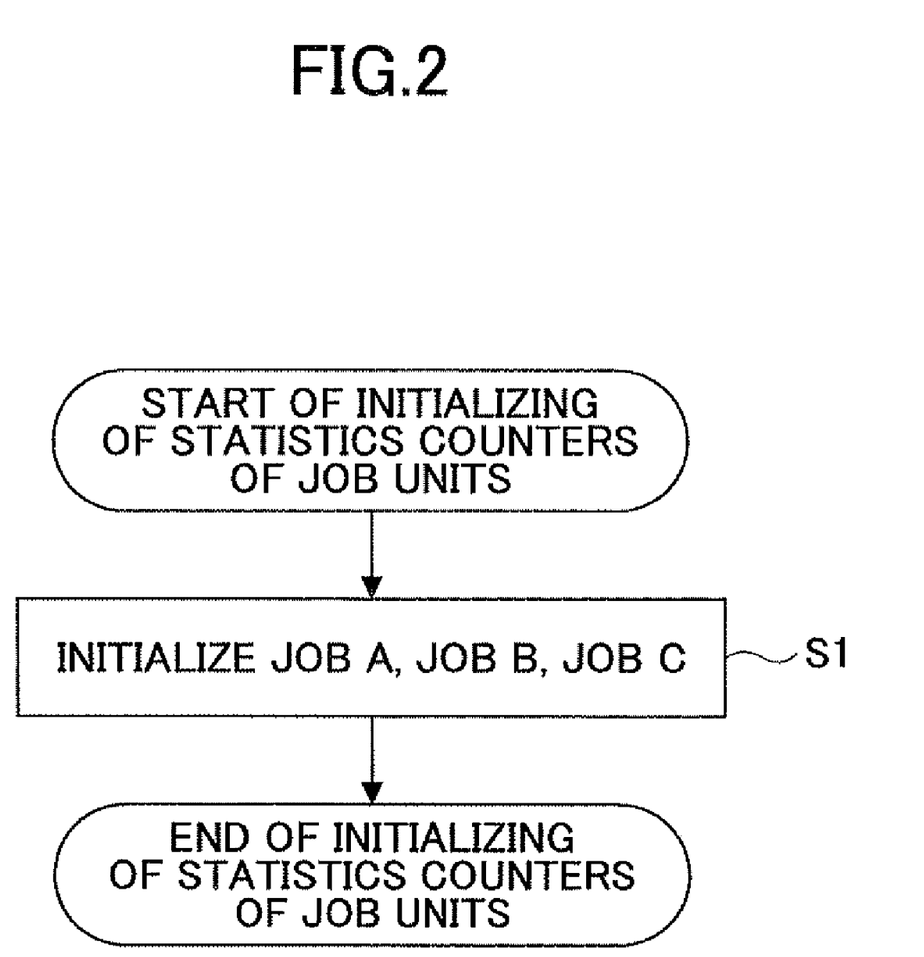
FIG. 2 depicts a flowchart illustrating initializing processing for statistics data of job units.

FIG. 2 depicts a flowchart illustrating initializing processing for statistics data of job units. In the processing, job counters Job A, Job B and Job C, for storing statistics data of job units are initialized to zeros (step S1). Here, as mentioned above, three job counters, i.e., Job A, Job B and Job C, are used. The job counter Job A stores statistics of printing jobs which are mainly composed of graphics. The job counter Job B stores statistics of printing jobs which are mainly composed of images. The job counter Job C stores statistics of printing jobs which are mainly composed of characters (i.e., text).

The initializing processing is carried out when the printer driver 103 is first installed in the information processing apparatus 100, or when a change of a printing quality setpoint is urged to a user. In step S1 of FIG. 2, all of respective count values of the job counters Job A, Job B and Job C are initialized to zeros, as mentioned above.

Figure 3:
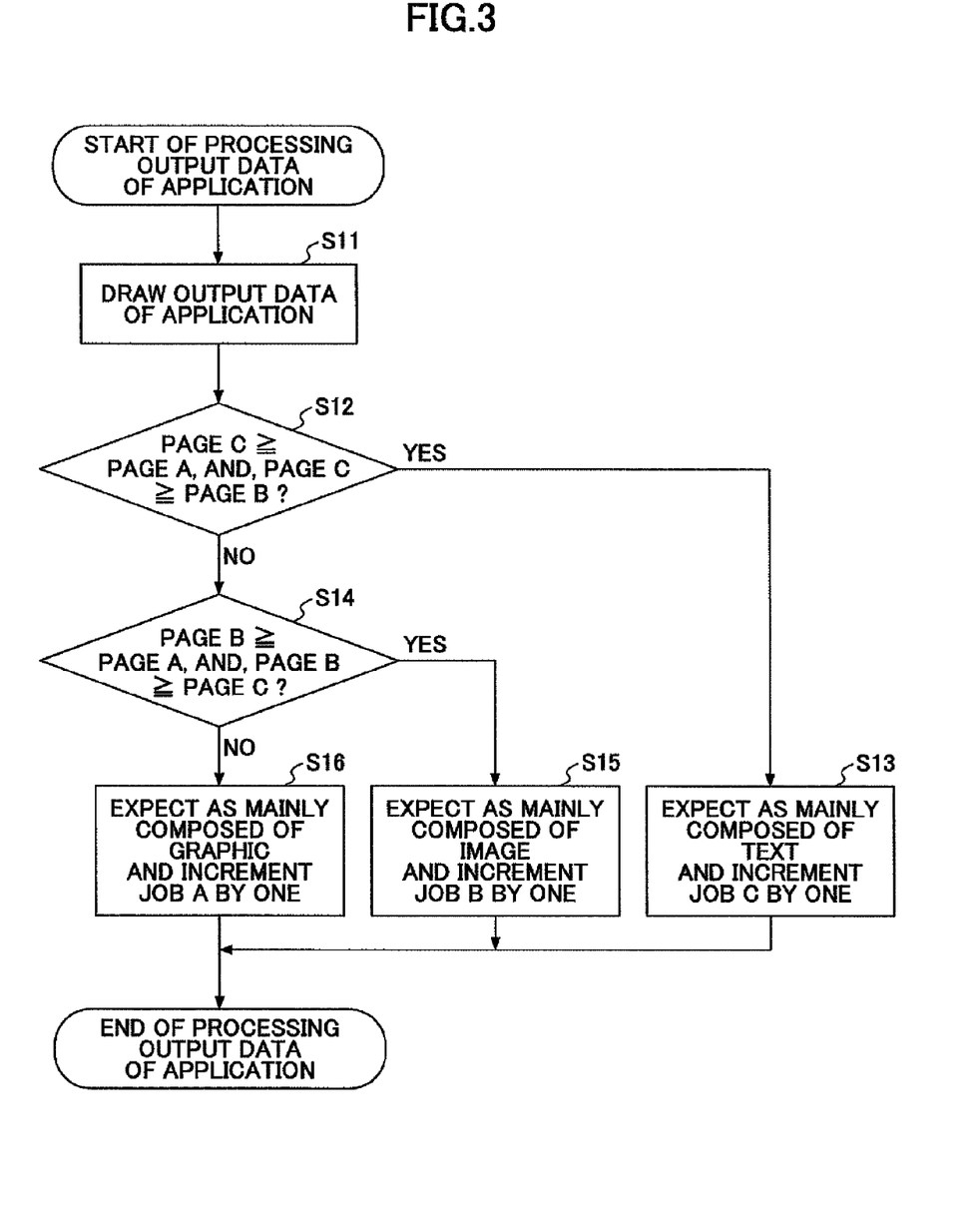
FIG. 3 depicts a flowchart illustrating processing of drawing output data of application.

FIG. 3 depicts a flowchart illustrating processing of drawing output data of the application 101.

Here, three page counters, i.e., Page A, Page B and Page C are used. The page counter Page A is used to store statistics of the number of pages mainly composed of graphics. The page counter Page B is used to store statistics of the number of pages mainly composed of images. The page counter Page C is used to store statistics of the number of pages mainly composed of characters (text). It is noted that, a specific example of a way of obtaining respective count values of the page counters Page A, Page B and Page C will be described later with reference to FIG. 4.

Output data, which corresponds to a printing job, provided by the application 101 undergoes drawing processing carried out by the drawing part 112 (step S11). Then, upon carrying out the drawing processing in step S11, the drawing part 112 obtains respective count values of the page counters Page A, Page B and Page C. Then, when a relationship between the respective count values of the page counters Page A, Page B and Page C is such that Page C$\geq$Page A and Page C$\geq$Page B (Yes in step S12), the drawing part 112 expects that the output data (printing job) of the application 101 is mainly composed of characters (text). Then, the drawing part 112 increments the job counter Job C by one (+1) (step S13). When the relationship between the respective count values of the page counters Page A, Page B and Page C is not such that Page C$\geq$Page A and Page C$\geq$Page B (No in step S12) but is such that Page B$\geq$Page A and Page B$\geq$Page C (Yes in step S14), the drawing part 112 expects that the output data (printing job) of the application 101 is mainly composed of images. Then, the drawing part 112 increments the job counter Job B by one (+1) (step S15). When the relationship between the respective count values of the page counters Page A, Page B and Page C is not such that Page B$\geq$Page A and Page B$\geq$Page C (No in step S14), the drawing part 112 expects that the output data (printing job) of the application 101 is mainly composed of graphics. Then, the drawing part 112 increments the job counter Job A by one (+1) (step S16).

That is, when the printing job corresponding to the output data of the application 101 is mainly composed of data to draw graphics, the count value of the corresponding job counter Job A is incremented by one (+1) (step S16). When the printing job is mainly composed of data to draw images, the count value of the corresponding job counter Job B is incremented by one (+1) (step S15). When the printing job is mainly composed of data to draw characters, the count value of the corresponding job counter Job C is incremented by one (+1) (step S13).

Figure 4:
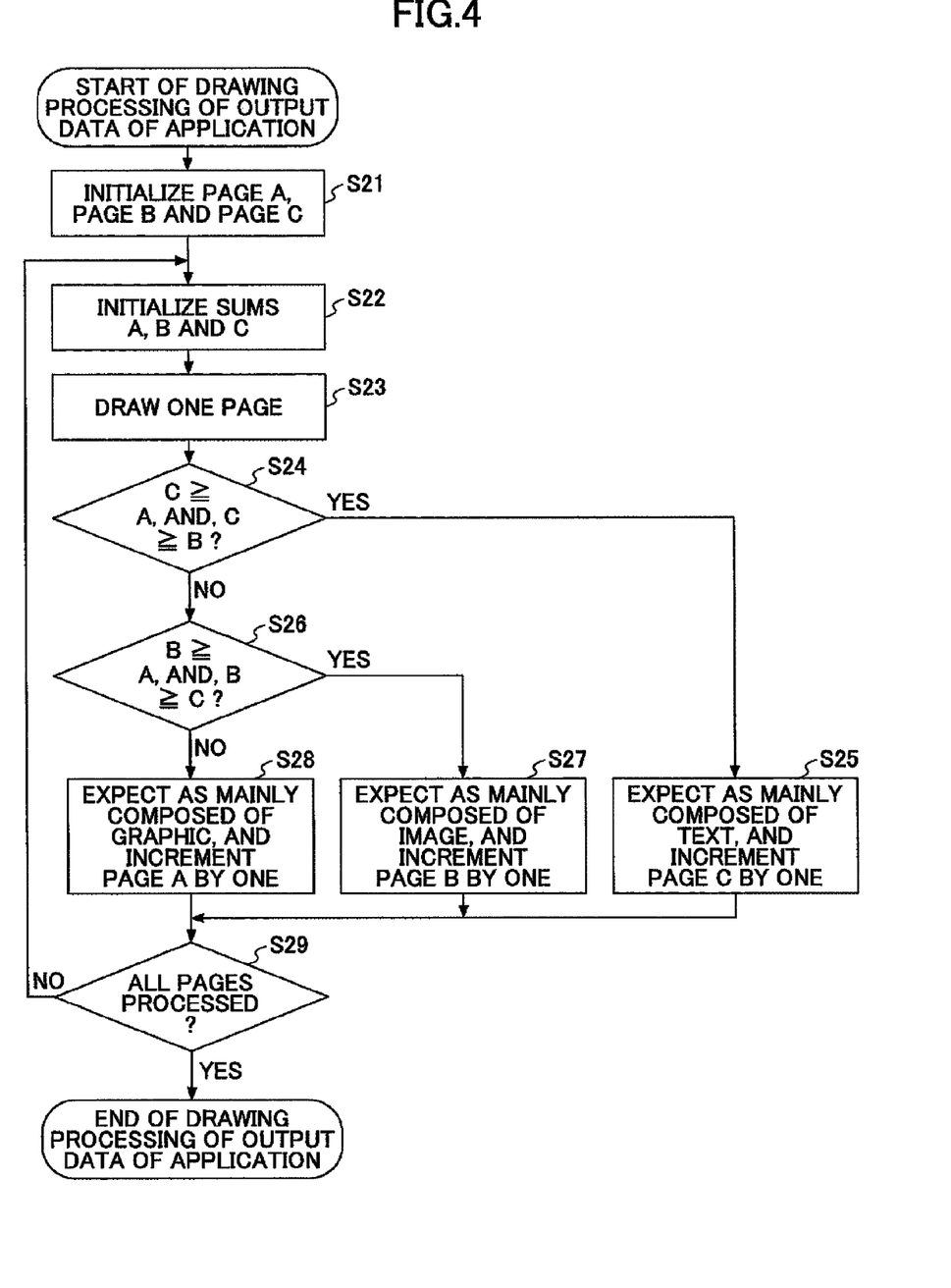
FIG. 4 depicts a flowchart illustrating processing of drawing output data of an application page by page.

FIG. 4 depicts a flowchart illustrating drawing processing for output data of the application 101.

Here, three counters A, B and C are used, and count values of these counters A, B and C are also referred to as sums A, B and C, respectively. The counter A is used to sum results of calculating areas of graphic objects. The counter B is used to sum results of calculating areas of image objects. The counter C is used to sum results of calculating areas of character objects. It is noted that, a specific example of a way of obtaining the count values A, B and C of the counters A, B and C will be described later with reference to FIG. 5.

In FIG. 4, first, the page counters Page A, Page B and Page C are initialized to zeros by the drawing part 112 (step S21). Then, the count values A, B and C (i.e., sums A, B and C) of the counters A, B and C are initialized to zeros by the drawing part 112 (step S22). Then, the drawing part 112 carries out drawing one page from the output data of the application 101 (step S23) and obtains the sums A, B and C of the counters A, B and C for the page.

Then, when the relationship between the sums A, B and C is such that $C \geq A$ and $C \geq B$ (Yes in step S24), the drawing part 112 expects that the page is mainly composed of text, and increments the corresponding page counter Page C by one (+1) (step S25). When the relationship between the sums A, B and C is not such that $C \geq A$ and $C \geq B$ (No in step S24) but such that $B \geq A$ and $B \geq C$ (Yes in step S26), the drawing part 112 expects that the page is mainly composed of images, and increments the corresponding page counter Page B by one (+1) (step S27). When the relationship between the sums A, B and C is not such that $B \geq A$ and $B \geq C$ (No in step S26), the drawing part 112 expects that the page is mainly composed of graphics, and increments the corresponding page counter Page A by one (+1) (step S28). A loop of the above-mentioned steps S22, S23, S24, S25 or S26, S27 or S28 are repeated for each page of the output data of the application 101. Then, when all the pages included in the output data (of the corresponding printing job) of the application 101 have been processed (Yes in step S29), the drawing processing for the printing job is finished. The drawing processing described above with reference to FIG. 4 may correspond to the drawing processing of step S11 of FIG. 3 described above.

That is, in the drawing processing of FIG. 4, each time when one page is drawn by the drawing part 112 in step S23, the following processing is carried out. That is, when the page is mainly composed of graphics, the drawing part 112 increments the count value (sum A) of the corresponding page counter Page A by one in steps S24, S26 and S28. When the page is mainly composed of images, the drawing part 112 increments the count value (sum B) of the corresponding page counter Page B by one in steps S24, S26 and S27. When the page is mainly composed of characters, the drawing part 112 increments the count value (sum C) of the corresponding page counter Page C by one in steps S24, S25.

Figure 5:
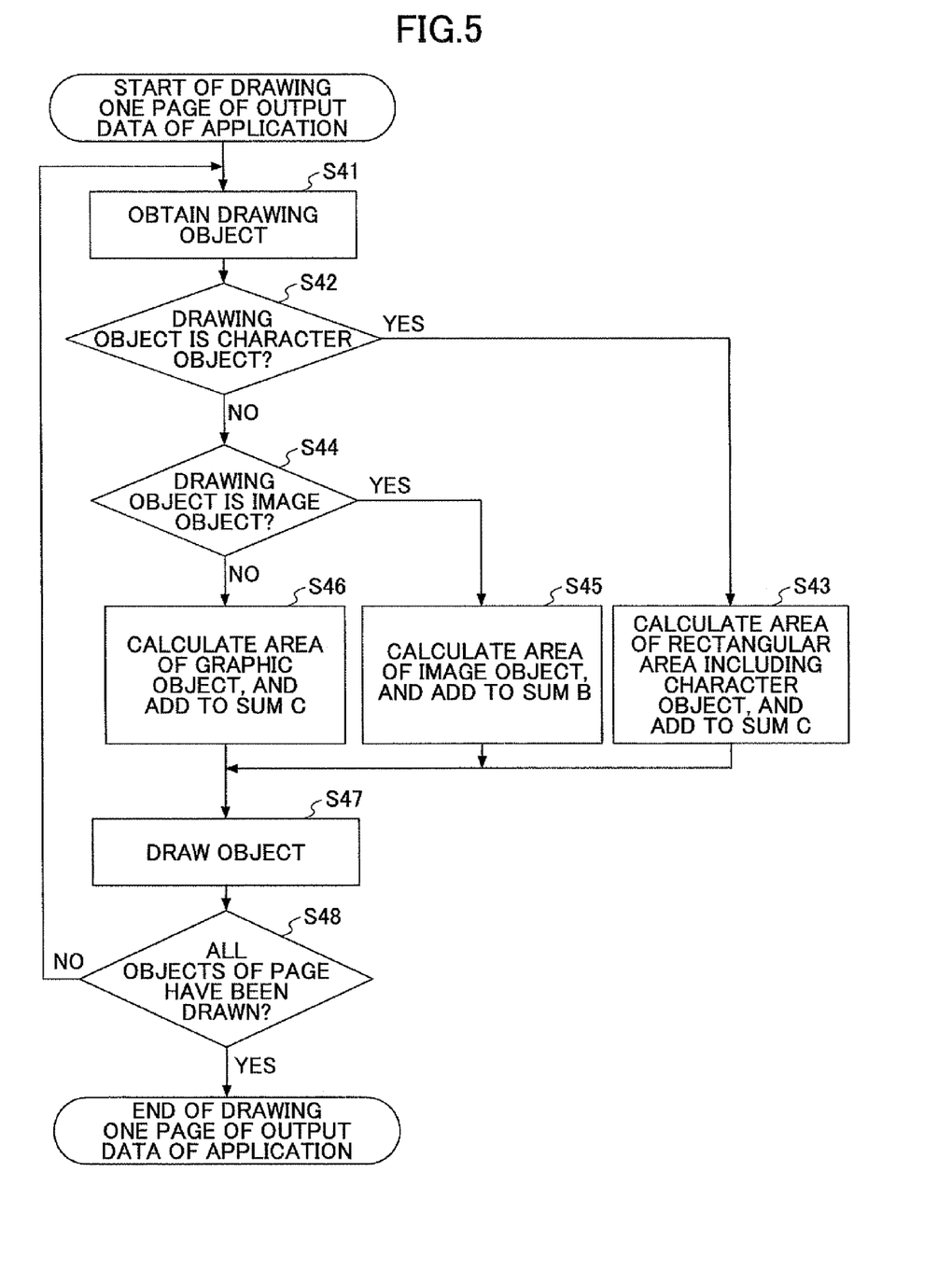
FIG. 5 depicts a flowchart illustrating drawing processing of a page of output data of an application.

FIG. 5 depicts a flowchart illustrating drawing processing for one page of output data of the application 103. The drawing processing for one page of output data of the application 103, which will be described with reference to FIG. 5, may correspond to the step S23 of FIG. 4.

In order to draw a drawing object included in a page of output data of the application 101, the drawing part 112 first obtains a drawing object from a page of the output data of the application 101 (step S41). Then, the drawing part 112 determines a type of the drawing object. Then, when the obtained drawing object is neither a character object nor an image object (No in step S42, and No in step S43), that is, when the obtained drawing object is a graphic object, the drawing part 112 calculates an area of the graphic object, and adds the calculated area amount to the count value A (i.e., sum A) of the corresponding counter A (step S46). When the obtained drawing object is not a character object but an image object (No in step S42, and Yes in step S43), the drawing part 112 calculates an area of the image object, and adds the calculated area amount to the count value B (i.e., sum B) of the corresponding counter B (step S45). When the obtained drawing object is a character object (Yes in step S42), the drawing part 112 calculates a rectangular area which includes the character object, and adds the calculated area amount to the count value C (i.e., sum C) of the corresponding counter C (step S43).

Next, in step S47, the drawing part 112 carries out drawing processing according to the drawing object obtained in step S41. Then, each time when obtaining a drawing object from the page of the output data of the application 101, the drawing part 112 repeats a loop of the above-mentioned steps S41, S42, S44, S46, or S45, or S43 and S47. When drawing all the drawing objects included in the page of the output data of the application 101 (Yes in step S48), the drawing part 112 finishes the drawing processing for the page. It is noted that, "drawing" means converting a drawing object into two-dimensional printing data such as bitmap data.

It is noted that, the above-mentioned processing to add a calculated area amount to a count value of a respective one of the counters A, B and C (step S46, S45 or S43) may be carried out either before or after a corresponding drawing object actually undergoes drawing processing.

Next, with reference to FIG. 6, the processing comparing the above-mentioned statistics (i.e., the respective count values of the job counters in the embodiment) with a printing quality setpoint will be described. It is noted that, in a flowchart of FIG. 6, as the statistics counters, the above-mentioned job counters Job A, Job B and Job C are used. However, instead, the above-mentioned page counters Page A, Page B and Page C may be used for the same purpose. Similarly, the above-mentioned counters A, B and C may be used for the same purpose.

First, the UI part 111 obtains a current printing quality setpoint (step S61). The printing quality setpoint means a setpoint such that, printing quality applied by the drawing part 112 when drawing processing is carried out on output data of the application 101 by the drawing part 112 is determined according to the printing quality setpoint. The printing quality setpoint is stored by the data part 113 and read by the drawing part 112. The drawing part 112 obtains respective count values of the job counters Job A, Job B and Job C from the data part 111. Then, when the respective count values of the job counters Job A, Job B and Job C have such a relationship that Job $C \geq$ Job A and Job $C \geq$ Job B, and further, the current printing quality setpoint is other than "priority to character" (Yes in step S62). That is, in terms of statistics, many jobs are those mainly composed of characters, but the current printing quality setpoint is other than "priority to character". It is noted that, the printing quality setpoint of "priority to character" means a printing quality setpoint considered as being optimum to a printing job mainly composed of data to draw characters. In this case, the UI part 111 sets a recommended setpoint for a printing quality setpoint as being "priority to character" (step S63).

When the above-mentioned conditions of step S62, i.e., the respective count values of the job counters Job A, Job B and Job C have such a relationship that Job $C \geq$ Job A and Job $C \geq$ Job B, and further, the current printing quality setpoint is other than "priority to character" are not met (No in step SC2), and the respective count values of the job counters Job A, Job B and Job C have such a relationship that Job $B \geq$ Job A and Job $B \geq$ Job C, and further, the current printing quality setpoint is other than "priority to image" (Yes in step S64). That is, in terms of statistics, many jobs are those mainly composed of images, but the current printing quality setpoint is other than "priority to image". It is noted that, the printing quality setpoint of "priority to image" means a printing quality setpoint considered as being optimum to a printing job mainly composed of images. In this case, the UI part 111 sets a recommended setpoint for a printing quality setpoint as being "priority to image" (step S65).

When the above-mentioned conditions of step S62, i.e., the respective count values of the job counters Job A, Job B and Job C have such a relationship that Job C≧Job A and Job C≧Job B, and further, the current printing quality setpoint is other than "priority to character" are not met (No in step S62), the above-mentioned conditions of step S64, i.e., the respective count values of the job counters Job A, Job B and Job C have such a relationship that Job B≧Job A and Job B≧Job C, and further, the current printing quality setpoint is other than "priority to image" are not met (No in step S64), and the respective count values of the job counters Job A, Job B and Job C have such a relationship that Job A≧Job B and Job A≧Job C, and further, the current printing quality setpoint is other than "priority to graphic" (Yes in step S66). That is, in terms of statistics, many jobs are those mainly composed of graphics, but the current printing quality setpoint is other than "priority to graphic". It is noted that, the printing quality setpoint of "priority to graphic" means a printing quality setpoint considered as being optimum to a printing job mainly composed of graphics. In this case, the UI part 111 sets a recommended setpoint for a printing quality setpoint as being "priority to graphic" (step S67).

Next, in step S68, the UI part 111 notifies a user of the above-mentioned recommended setpoint (set in step S63, S65 or S67) for a printing quality setpoint, and urges the user to change the current printing quality setpoint to the recommended setpoint.

Finally, in step S69, the UI part 111 initializes the statistics counters, i.e., the job counters Job A, Job B and Job C in the embodiment, and further, the page counters Page A, Page B and Page C and the counters A, B and C, to zeros.

When none of the conditions of step S62, S64 and S66 are met, i.e., No in step S62, No in step S64 and No in step S66, the UI part 111 then directly carries out step S69 without carrying out any of steps S63, S65, S67 and S68.

The UI part 111 carries out the processing of comparing the statistics with the current printing quality setpoint described above with reference to FIG. 6, when, for example, any one of the following three conditions is met, and a user opens the printing property page via the UI part 111, or a printing request is executed.

<Conditions>

(1) The UI part 111 carries out the processing of FIG. 6 each time when a predetermined time period has elapsed.

(2) The UI part 111 carries out the processing of FIG. 6 each time when a total print amount (for example, the total number of printed paper sheets) exceeds a predetermined amount.

(3) The UI part 111 carries out the processing of FIG. 6 each time when the number of given printing jobs exceeds a predetermined amount.

Next, as to processing of the UI part 111, notifying a user of the above-mentioned recommended setpoint to urge the user to change the current printing quality setpoint to the recommended setpoint, will now be described with reference to a flowchart of FIG. 7.

Figure 8:
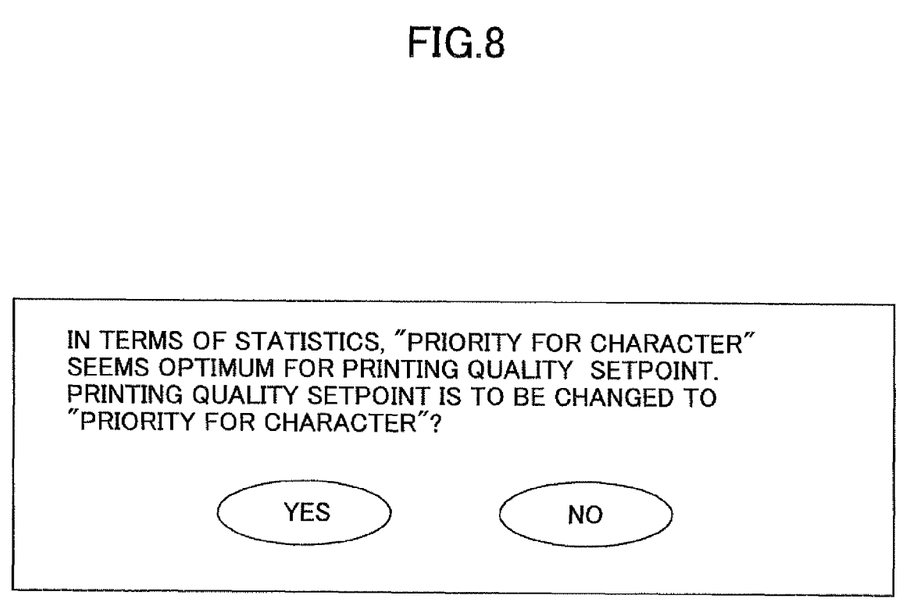
FIG. 8 illustrates a display example of UI processing depicted in FIG. 7.

The UI part 111 first notifies a user of the above-mentioned recommended setpoint for a printing quality setpoint to urge the user to change a current printing quality setpoint to the recommended setpoint (step S81). FIG. 8 depicts an example of a display notifying a user of the recommended setup for a printing quality setpoint to urge the user to change a current printing quality setpoint to the recommended setpoint. When the user approves changing the current printing quality setpoint to the recommended setpoint in response to the notification (Yes in step S82), the UI part 111 actually changes the current printing quality setpoint to the recommended setpoint (step S83).

The processing of notifying a user of the recommended setup for a printing quality setpoint to urge the user to change a current printing quality setpoint to the recommended setpoint is carried out, for example, when printing is carried out from the application 101, the printing property page of the printer driver 103 is opened, power is turned on in the information processing apparatus 100 and the OS is started up, or such. As a result of the processing of notifying a user of the recommended setup for a printing quality setpoint to urge the user to change a current printing quality setpoint to the recommended setpoint being carried out, a display such as that depicted in FIG. 8 is carried out as is necessary.

According to the embodiment, as described above, types of drawing objects included in each page of a given printing job are detected, and statistics data for a rate of each type of drawing object for a plurality of printing jobs requested by a user are detected. The detected statistics data are stored, and then, a recommended setpoint derived from the statistics data for a printing quality setpoint is compared with a current printing quality setpoint. When a result of the comparison indicates that the recommended setpoint is different from the current printing quality setpoint, a notification is carried out to a user to urge the user to change the current printing quality setpoint to the recommended setpoint. Then, when the user approves (through the UI part 111) changing the current printing quality setpoint to the recommended setpoint, the current printing quality setpoint is actually changed to the recommended setpoint. Thereby, even when the user does not know details of the printing quality setpoint, an optimum printing result can be provided.

Specifically, in the above-mentioned processing, for each type of drawing object (i.e., character objects, graphic objects and image objects) sent to the printer driver 103 from the application 101, the printer driver 103 sums areas, for which each type of drawing object accounts, in a printing page. Thus, for each printing page, three sums, i.e., a sum of areas for which characters account, a sum of areas for which graphics account, and a sum of areas for which images account, are calculated. As a result, when a rate of the sum of areas for which characters account is large in a printing page, it can be expected that "priority to character" is suitable as a printing quality setpoint. Similarly, when a rate of the sum of areas for which graphics account is large in a printing page, it can be expected that "priority to graphic" (or "priority to character/graphic") is suitable as a printing quality setpoint. Similarly, when a rate of the sum for which images account is large in a printing page, it can be expected that "priority to images" (or "priority to photograph") is suitable as a printing quality setpoint.

In particular, in a case where there is a tendency of types of printing documents, such as printing documents for an office work of a routine work, the above-mentioned calculation results for the respective sums of areas for which the respective types of drawing objects account are stored as statistics data for respective printing jobs. As a result, it is possible to expect whether printing jobs of documents, printing jobs of graphs, or printing jobs of images are more likely than the others, as a tendency. Therefore, it is possible to advise a user of a recommended setpoint for an initial setpoint of a printing quality setpoint.

Thus, in the embodiment, rates of areas of a printing page for which each type of drawing object accounts and/or statistics data thereof for respective printing jobs are used to expect a suitable printing quality setpoint for a user. Therefore, it is possible to urge the user to change a current printing quality setpoint to a recommended setpoint corresponding to a printing quality setpoint suitable to printing data of the user by means of a display via a UI, or such.

Next, another embodiment will be described with reference to a flowchart depicted in FIG. 9. The same as in the processing described above with reference to the flowchart of FIG. 6, as statistics counters, the above-mentioned job counters Job A, Job B and Job C are used in the flowchart of FIG. 9. However, instead, the above-mentioned page counters Page A, Page B and Page C may be used for the same purpose. Similarly, the above-mentioned counters A, B and C may be used for the same purpose.

Figure 9:
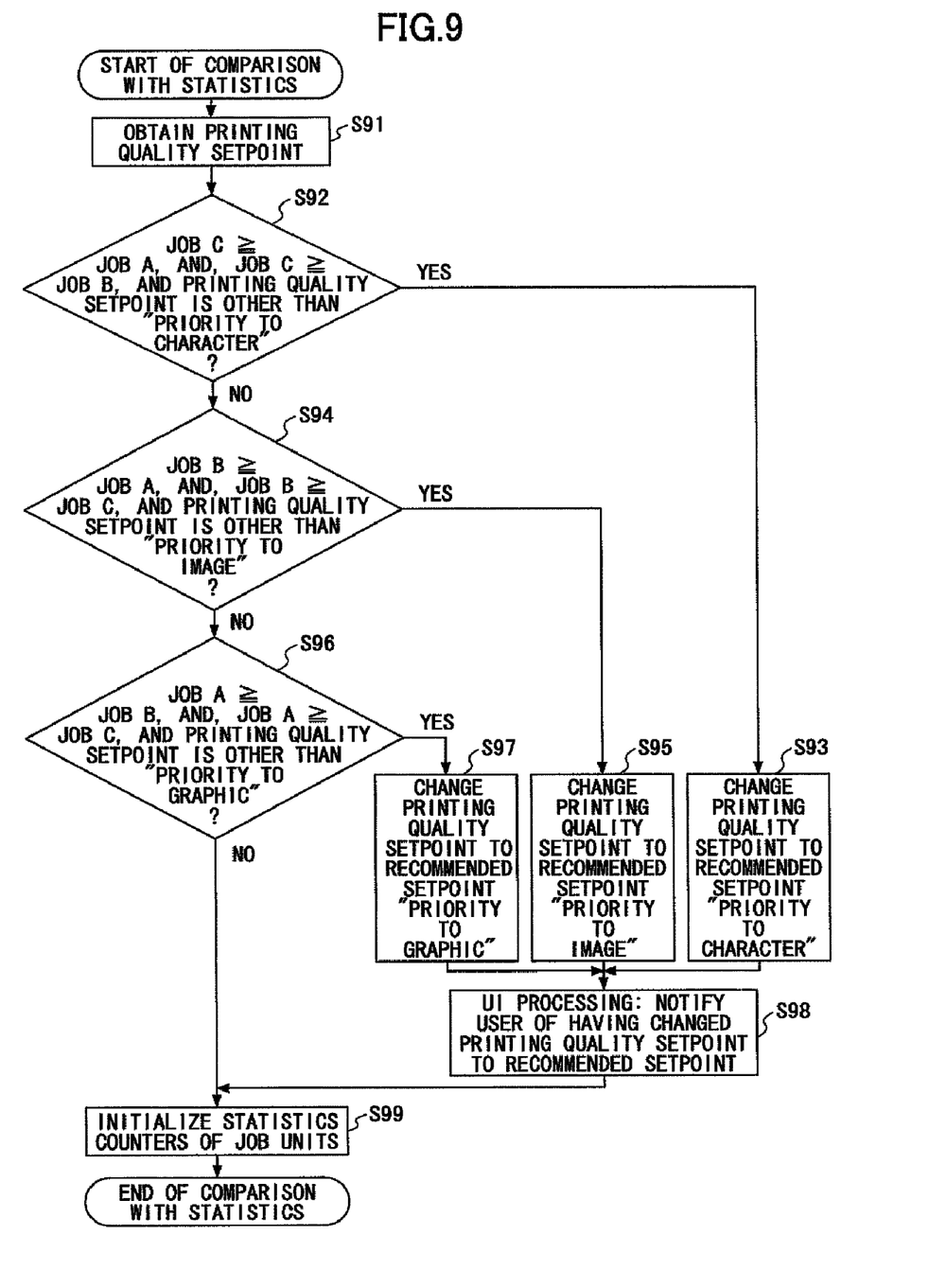
FIG. 9 depicts a flowchart illustrating another example of comparing processing between statistics and a printing quality setpoint.

In FIG. 9, steps S91, S92, S94, S96 and S99 are the same as the steps S61, S62, S64, S66 and S69 in FIG. 6, respectively, and duplicate description will be omitted. In processing of FIG. 9, different from the processing of FIG. 6, the UI part 11 first changes a current printing quality setpoint to a recommended setpoint (in step S97, S95 or S93), and then, the UI part 111 notifies a user that the current printing quality setpoint has been changed to the recommended setpoint (step S98).

Thus, in the other embodiment described above with reference to FIG. 9, types of drawing objects included in each page of a given printing job are detected, and statistics data for a rate of each type of drawing object for a plurality of printing jobs requested by a user is detected. The detected statistics data are stored, and then, a recommended setpoint derived from the statistics data for a printing quality setpoint is compared with a current printing quality setpoint. When a result of the comparison indicates that the recommended setpoint is different from the current printing quality setpoint, the current printing quality setpoint is changed to the recommended setpoint. After the current printing quality setpoint is thus changed to the recommended setpoint, a notification that the current printing quality setpoint has been changed to the recommended setpoint is carried out to a user. Thereby, also in the other embodiment described above with reference to FIG. 9, even when the user does not know details of the printing quality setpoint, an optimum printing result can be provided.

It is noted that, in each of the above-mentioned embodiments, the count values of statistics counters are summed up, in units of printing jobs (i.e., Job A, Job B and Job C) as described above with reference to FIG. 3 and FIG. 6, steps S62, S64 and S66 and FIG. 9, steps S92, S94 and S96. However, it is also possible to sum up count values of statistics counters, in units of pages (i.e., Page A, Page B and Page C), or sum up count values of statistics counters, in units of drawing objects.

Figure 10:
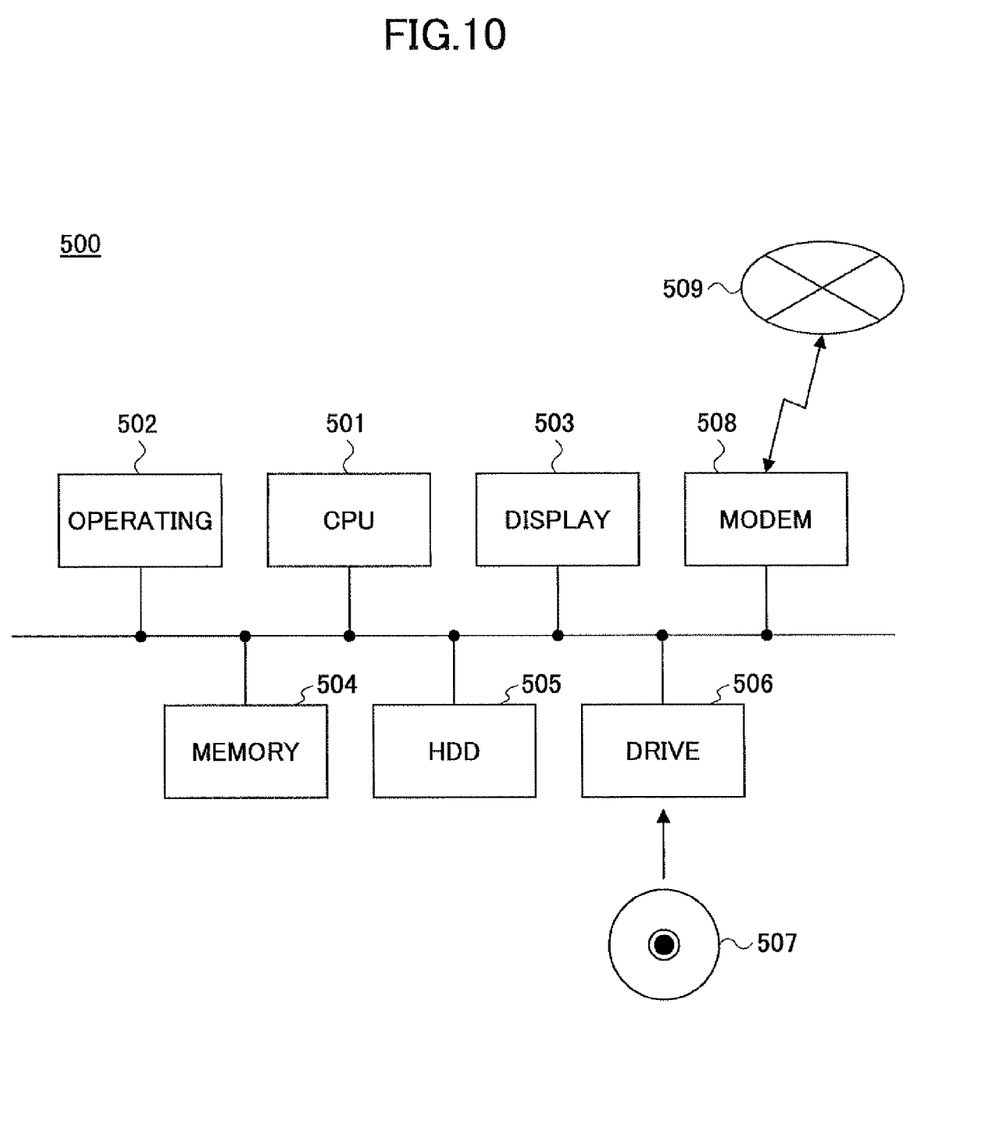
FIG. 10 depicts a hardware block diagram of one example of a computer illustrating a case where the information processing apparatus depicted in FIG. 1 is configured by the computer.

FIG. 10 depicts a block diagram illustrating an example of a hardware configuration of a computer for a case where the information processing apparatus 100 is configured by the computer.

As depicted in FIG. 10, the computer 500 acting as the information processing apparatus 100 includes a CPU 501 performing various operations by executing programs, an operating part 502 such as a keyboard, a mouse or such for a user to input operating contents or data, a display part 503 such as a CRT, a liquid crystal display device or such for displaying processing processes, processing results of the CPU 501 or such to a user, a memory 504 such as a ROM, a RAM or such for storing programs, data or such, or used as a work area of the CPU 501, a hard disk drive 505 for storing programs, data or such, a CD-ROM drive 506 for externally loading programs or data with the use of a CD-ROM 507, and a modem 508 for downloading programs or data from an external server or such via a communication network 509 such as the Internet, a LAN or such.

To the computer 500, with the use of the CD-ROM 507 or with the use of the communication network 509, respective programs of the above-mentioned application 101, the spooler 102 and the printer driver 103 are loaded or downloaded. Then, the programs are installed in the computer 500, and the CPU 501 executes the programs. Thereby, the information processing apparatus 100 depicted in FIG. 1 and also, depicted in FIG. 11 described below, is realized.

Figure 11:
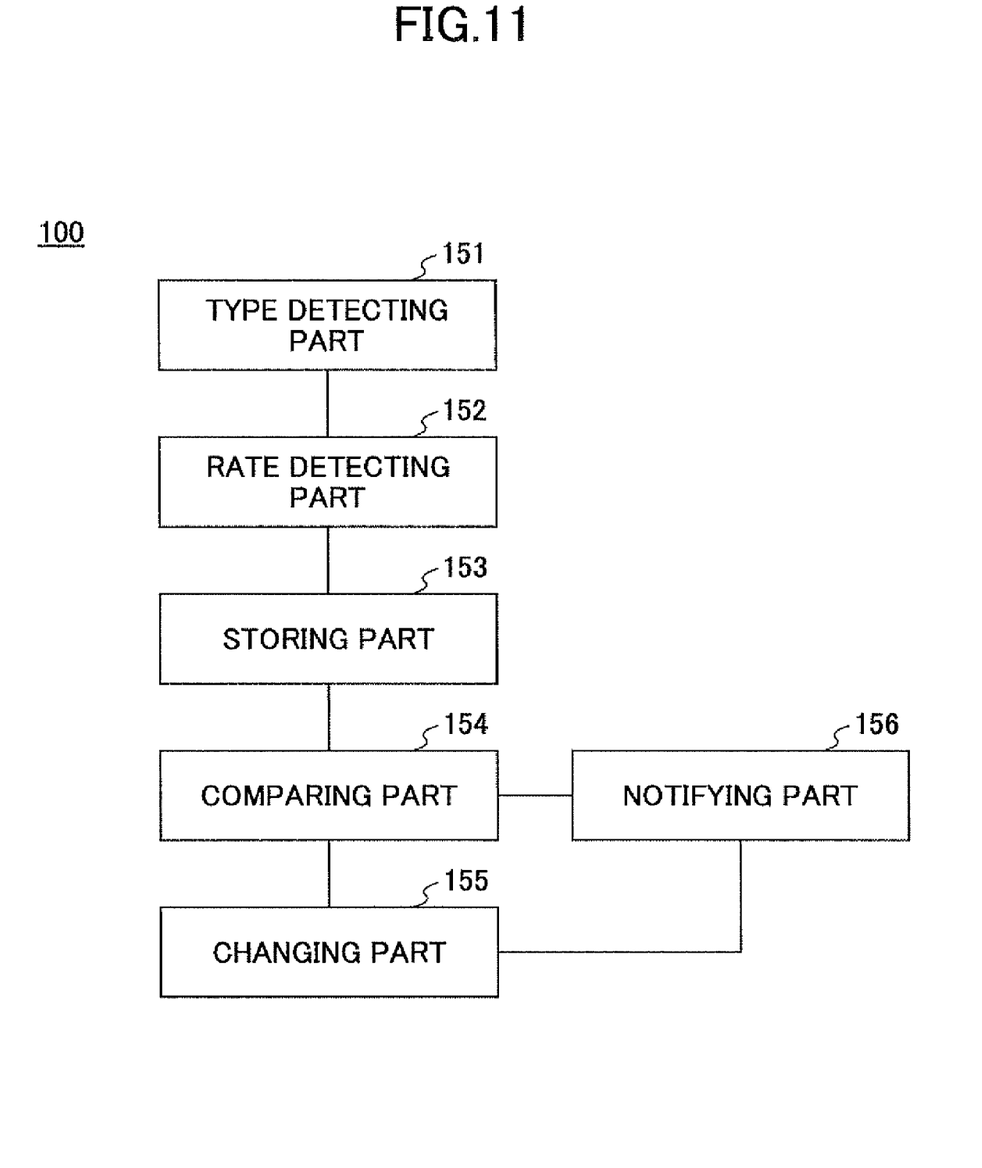
FIG. 11 depicts another function diagram of the information processing apparatus depicted in FIG. 1.

FIG. 11 depicts a functional block diagram of the information processing apparatus 100. It is noted that, for the purpose of simplifying description, functional parts corresponding to drawing processing itself are omitted.

As depicted in FIG. 11, the information processing apparatus 100 includes a type detecting part 151, a rate detecting part 152, a storing part 153, a comparing part 154, a changing part 155 and a notifying part 156. In a case where the information processing apparatus 100 is configured by the computer as described above with reference to FIG. 10, the CPU 501 and the memory 504 may act as the type detecting part 151, the rate detecting part 152, the storing part 153, the comparing part 154, the changing part 155 and the notifying part 156 by executing corresponding program(s).

The type detecting part 151 detects types of drawing objects included in a printing job. The rate detecting part 152 detects a rate of each type of drawing object. The storing part 153 stores the rate of each type of drawing object as a count value of a statistics counter which counts predetermined units of drawing objects for each type of drawing object. The comparing part 154 compares a previously set printing quality setpoint with a recommended printing quality setpoint which is derived from count values of the statistics counters. The changing part 155 changes the previously set printing quality setpoint to the recommended printing quality setpoint when the previously set printing quality setpoint is different from the recommended printing quality setpoint. The notifying part 156 notifies a user of having changed the previously set printing quality setpoint to the recommended printing quality setpoint.

It is noted that, the notifying part 156 may notify a user of urging the user to change the previously set printing quality setpoint, when the previously set printing quality setpoint is different from the recommended printing quality setpoint. In this case, the changing part 155 changes the previously set printing quality setpoint to the recommended printing quality setpoint after a change of the previously set printing quality setpoint is approved by the user in response to a notification carried out by the notifying part 156.

The above-mentioned type detecting part 151 may detect types of drawing objects included in each page of a printing job. The above-mentioned rate detecting part 152 may act as a statistics data detecting part to detect statistics data of a rate for each type of drawing object for a plurality of printing jobs which a user requests. The storing part 153 may store the statistics data. The comparing part 154 may compare a current printing quality setpoint with a recommended printing quality setpoint which is derived from the statistics data. The notifying part 156 may notify a user of urging the user to change the printing quality setpoint to the recommended printing quality setpoint, when the current printing quality setpoint is different from the recommended printing quality setpoint. The changing part 155 may change the current printing quality setpoint to the recommended printing quality setpoint when a change of the current printing quality setpoint to the recommended printing quality setpoint is approved by the user in response to a notification of the notifying part.

The present invention is not limited to the specifically disclosed embodiments, and variations and modifications may be made without departing from the scope of the present invention.

The present application is based on Japanese priority applications Nos. 2008-158628 and 2009-140831, filed Jun. 18, 2008 and Jun. 12, 2009, respectively, the entire contents of which are hereby incorporated herein by reference.

What is claimed is:

1. An information processing apparatus comprising:
a type detecting part configured to detect types of drawing objects included in a printing job;
a rate detecting part configured to detect a rate of each type of the drawing objects for each page of the printing job by detecting which type of the drawing objects mainly composes the each page of the printing job;
a storing part configured to store a count value of a statistics counter for the each type of the drawing objects, said statistics counter being configured to increment the count value by a predetermined unit for the type of the drawing objects which has been detected to mainly compose the each page of the printing job;
a comparing part configured to compare a previously set printing quality setpoint with a recommended printing quality setpoint which is derived from the counter value of the statistics counter for the each type of the drawing objects; and
a changing part configured to change the previously set printing quality setpoint to the recommended printing quality setpoint when the previously set printing quality setpoint is different from the recommended printing quality setpoint.

2. The information processing apparatus as claimed in claim 1, further comprising:
a notifying part configured to notify a user of urging the user to change the previously set printing quality setpoint, when the previously set printing quality setpoint is different from the recommended printing quality setpoint, wherein:
the changing part changes the previously set printing quality setpoint to the recommended printing quality setpoint when a change of the previously set printing quality setpoint is approved by the user in response to a notification carried out by the notifying part.

3. The information processing apparatus as claimed in claim 1, further comprising:
a notifying part configured to notify a user of having changed the previously set printing quality setpoint to the recommended printing quality setpoint.

4. The information processing apparatus as claimed in claim 1, wherein:
the rate detecting part detects the rate of each type of the drawing objects by calculating an area accounted for by the each type of the drawing objects in the each page of the printing job.

5. The information processing apparatus as claimed in claim 4, wherein:
the rate detecting part uses an area of a rectangle which includes a character, to detect a rate of a character type of drawing object as a type of drawing object.

6. An information processing apparatus comprising:
a type detecting part configured to detect types of drawing objects included in each page of a printing job;
a statistics data detecting part configured to detect statistics data of a rate for each type of drawing objects for the each page of the printing job by detecting which type of the drawing objects mainly composes the each page of the printing job for a plurality of printing jobs which a user requests;
a storing part configured to store the statistics data including a count value of a statistics counter for the each type of the drawing objects, said statistics counter being configured to increment the count value by a predetermined unit for the drawing object which has been detected to mainly compose the each page of the printing job;
a comparing part configured to compare a current printing quality setpoint with a recommended printing quality setpoint which is derived from the statistics data;
a notifying part configured to notify a user of urging the user to change the printing quality setpoint to the recommended printing quality setpoint, when the current printing quality setpoint is different from the recommended printing quality setpoint; and
a changing part configured to change the current printing quality setpoint to the recommended printing quality setpoint when a change of the current printing quality setpoint to the recommended printing quality setpoint is approved by the user in response to a notification of the notifying part, wherein:
the information processing apparatus comprises a computer, and
the computer acts as the type detecting part, the statistics data detecting part, the storing part, the comparing part, the notifying part and the changing part as a result of a computer processor executing corresponding programs.

7. A non-transitory computer-readable information recording medium storing a program which, when executed by a computer processor, performs:
detecting types of drawing objects included in a printing job;
detecting a rate of each type of the drawing objects for each page of the printing job by detecting which type of the drawing objects mainly composes the each page of the printing job;
storing a count value of a statistics counter for the each type of the drawing objects, said statistics counter being configured to increment the count value by a predetermined unit for the drawing object which has been detected to mainly compose the each page of the printing job;
comparing a previously set printing quality setpoint with a recommended printing quality setpoint which is derived from the counter value of the statistics counter for the each type of the drawing objects; and
changing the previously set printing quality setpoint to the recommended printing quality setpoint when the previously set printing quality setpoint is different from the recommended printing quality setpoint.

* * * * *